(No Model.)
J. ULRICH.
DRILL CHUCK.
No. 533,759. Patented Feb. 5, 1895.
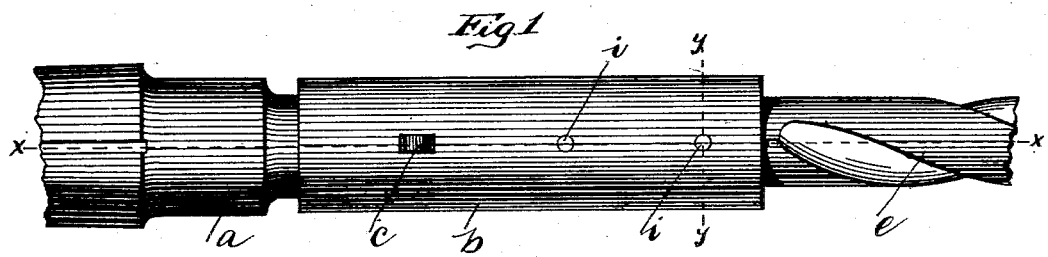
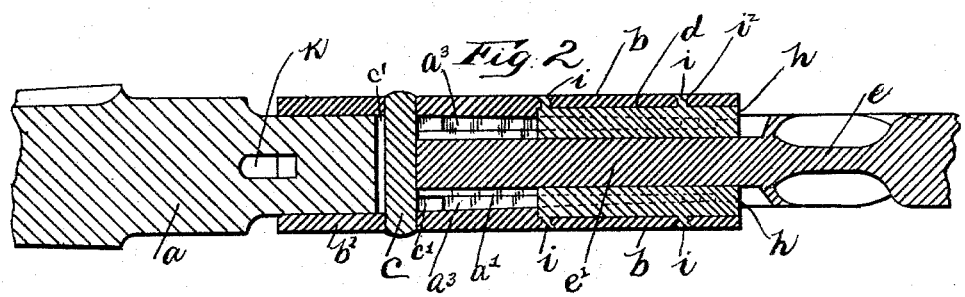
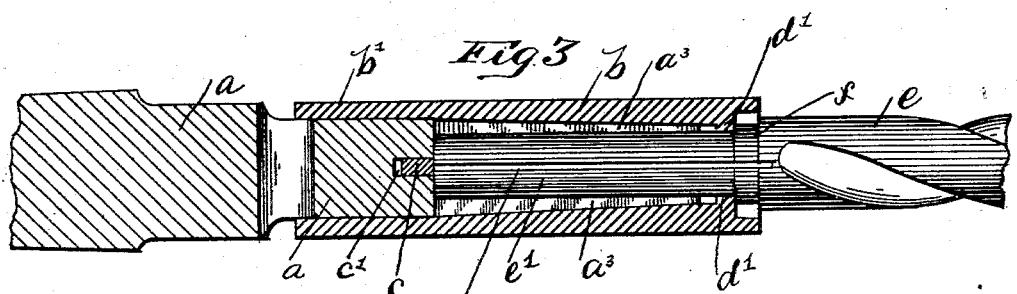
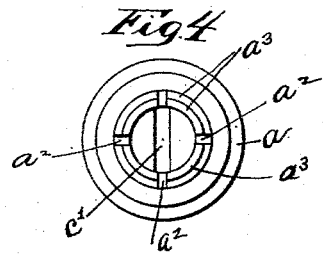 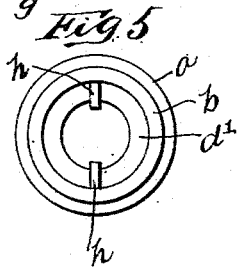 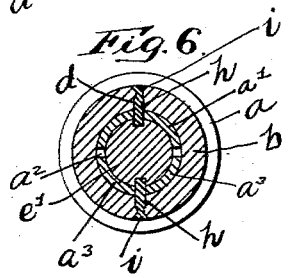
Witnesses:
H. B. Bradshaw
S. J. Adams
Inventor.
John Ulrich
By C. C. Shepherd
Attorney.

UNITED STATES PATENT OFFICE.

JOHN ULRICH, OF COLUMBUS, OHIO.

DRILL-CHUCK.

SPECIFICATION forming part of Letters Patent No. 533,759, dated February 5, 1895.

Application filed November 3, 1894. Serial No. 527,837. (No model.)

*To all whom it may concern:*

Be it known that I, JOHN ULRICH, a citizen of the United States, residing at Columbus, in the county of Franklin and State of Ohio, have invented a certain new and useful Improvement in Drill-Chucks, of which the following is a specification.

My invention relates to that class of drill holding chucks which are adapted to be used in the ordinary forms of drill presses.

The objects of my invention are to provide an improved construction of drill holding chuck by means of which a drill may be firmly and rigidly supported in position for use; to so hold the drill shank as to obviate any tendency of the same toward breaking and to produce other improvements in details of construction which will be more fully pointed out hereinafter. These objects are accomplished in the manner illustrated in the accompanying drawings, in which—

Figure 1 is a view in elevation of my improved chuck. Fig. 2 is a central longitudinal section on line $xx$ of the same, said section being taken through a portion of the drill. Fig. 3 is a similar sectional view taken at right angles with that shown in Fig. 2 and showing the drill shank in elevation. Fig. 4 is an end view of the chuck with the clamping ferrule or sleeve omitted. Fig. 5 is an end view with the ferrule in place, and Fig. 6 is a transverse section on line $yy$ of Fig. 1.

Similar letters refer to similar parts throughout the several views.

$a$ represents the chuck body the upper end portion of which is adapted to be inserted into the usual revolving drill posts of a drill press. The lower or drill supporting end $a'$ of the chuck is substantially tubular in form, as shown, said tubular portion being provided at regular intervals with longitudinal cuts $a^2$ whereby said tubular or drill holding portion is quartered or separated into four parts or clamping sections $a^3$.

The divided chuck portion formed as above described is adapted to be incased within a sleeve or ferrule $b$, the latter being as indicated more clearly in Fig. 3 of the drawings made to taper on its inner side toward its outer or lower end. The sleeve or ferrule $b$ is provided with a straight upward extension $b'$ which fits over a portion of the chuck body $a$. This sleeve is adapted to be retained in its place by means of a transverse pin $c$, which as shown, passes through said sleeve and through an opening $c'$ formed in the solid portion of the chuck.

The forward portion of the sleeve $b$ is provided on its inner surface with oppositely located longitudinal key ways $d$. Adjacent to the lower or outer end of the sleeve the latter is provided with an internal shoulder $d'$.

$e$ represents the drill which may be of the usual or desired form and $e'$ is the drill stem or shank which is adapted to be supported within the holding chuck. This shank portion is provided at its junction with the drill body with a peripheral flange $f$ which, when said shank is inserted within the tubular and divided portion of the chuck, abuts against the internal shoulder $d'$ of the sleeve $b$. In the drill shank are formed longitudinally two oppositely located key ways or grooves $g$.

$h$ represents key plates which are adapted as shown in the drawings to bear between the drill shank and inner surface of the sleeve $b$ the longer edges of said keys fitting within the key ways $g$ of the drill shank and the key ways $d$ of the sleeve. The outer edge of each of these keys is provided with one or more projecting rivets $i$ said rivets being adapted to project through rivet holes $i^2$ formed in the sleeve.

The manner of connecting the drill shank with my improved chuck is substantially as follows: The oppositely located keys $h$ being supported in the position shown and described by spreading the heads of the rivets in the mouths of the rivet holes, and said keys being made to project inward between the divided sections $a^3$, of the chuck, the drill shank is inserted within said chuck in such position as to bring the keys within the key ways thereof. Owing to the contact of the drill shoulder $f$ with the sleeve shoulder $d'$ it will be seen that the sleeve will be pressed upward or inward. Owing to the tapering form of the inner surface of said sleeve it will be seen that this upward movement of the latter must result in a wedging or clamping of the sections $a^3$ of the chuck firmly against the drill shank. In this manner it will be seen that the drill shank will be firmly grasped by the chuck sections and that the upward pressure of the sleeve which will be constantly produced by the engagement of the drill with the material in which it is working will only result in a tightening of the grasp of said chuck sections about said shank.

From the construction and operation which I have herein shown and described it will be seen that the connections of the chuck and drill shank are formed with the sides of the latter, instead of at the end thereof, thus producing a strong and effective connection of said parts which will not be readily broken and which will prevent their separation.

In order to facilitate the removal of the sleeve and drill from the chuck body after the withdrawal of the pin $c$ I provide the body of the chuck with a transverse slotted opening which is opposite and above the upper end of said sleeve. By inserting or driving a suitable wedge shaped body into said opening $k$ and against the end of the sleeve said sleeve may be readily forced off the chuck.

Having now fully described my invention, what I claim, and desire to secure by Letters Patent, is—

1. In a drill holding chuck the combination with the chuck body the latter having a tubular extension said extension being divided into separated longitudinal sections, of a sleeve having a tapering inner surface, means for connecting said sleeve with the chuck body and a shoulder in the forward end of said sleeve substantially as and for the purpose specified.

2. The combination with a drill chuck body the latter being provided with a divided tubular longitudinal supporting extension, of a sleeve adapted to inclose said tubular chuck portion said sleeve having a tapering inner surface, longitudinal key ways in said sleeve, a drill and shank therefor, said drill shank having longitudinal key ways formed therein, keys fitting as described within the key ways of said shank and sleeve and riveted projections on said keys adapted to be secured in openings formed in the sleeve substantially as and for the purpose specified.

JOHN ULRICH.

In presence of—
C. M. VOORHEES,
H. B. BRADSHAW.